United States Patent
Dong et al.

(10) Patent No.: US 9,987,707 B2
(45) Date of Patent: Jun. 5, 2018

(54) 3D PRINT APPARATUS AND METHOD UTILIZING FRICTION STIR WELDING

(71) Applicants: Xiao Dong, Kirkland, WA (US); Qing Dong, Beijing (CN)

(72) Inventors: Xiao Dong, Kirkland, WA (US); Qing Dong, Beijing (CN)

( * ) Notice: Subject to any disclaimer, the term of this patent is extended or adjusted under 35 U.S.C. 154(b) by 0 days. days.

(21) Appl. No.: 15/284,941

(22) Filed: Oct. 4, 2016

(65) Prior Publication Data

US 2018/0050418 A1  Feb. 22, 2018

(51) Int. Cl.
*B23K 20/12* (2006.01)
*B33Y 10/00* (2015.01)
*B33Y 70/00* (2015.01)
*B29C 67/00* (2017.01)

(52) U.S. Cl.
CPC ........ *B23K 20/123* (2013.01); *B23K 20/1245* (2013.01); *B29C 67/0074* (2013.01); *B33Y 10/00* (2014.12); *B33Y 70/00* (2014.12)

(58) Field of Classification Search
CPC .............. B23K 20/123; B23K 20/1245; B23K 20/122–20/128; B33Y 10/00; B33Y 70/00; B29C 67/0074
USPC .............................................. 228/112.1, 2.1
See application file for complete search history.

(56) References Cited

U.S. PATENT DOCUMENTS

| | | |
|---|---|---|
| 5,460,317 A | 10/1995 | Thomas et al. |
| 5,794,835 A | 8/1998 | Colligan et al. |
| 5,813,592 A | 9/1998 | Midling et al. |
| 5,893,507 A | 4/1999 | Ding et al. |
| 6,138,895 A | 10/2000 | Oelgoetz et al. |
| 6,199,745 B1 | 3/2001 | Campbell et al. |

(Continued)

FOREIGN PATENT DOCUMENTS

| | | | | |
|---|---|---|---|---|
| CA | 2926542 A1 | * | 5/2015 | ......... B23K 20/1255 |
| JP | 2002126882 A | * | 5/2002 | ........... B23K 20/128 |

(Continued)

*Primary Examiner* — Kiley Stoner
(74) *Attorney, Agent, or Firm* — Dean A. Craine

(57) ABSTRACT

This invention discloses a 3D printing apparatus and method utilizing friction stir welding (FSW). The apparatus includes a material feeding mechanism, a control mechanism, a friction stir welding (FSW) mechanism, and a friction stir welding (FSW) rotation drive mechanism. The control mechanism controls the material feeding mechanism, the FSW mechanism and the FSW rotation drive mechanism. In addition to the control mechanism, the FSW mechanism also connects to the FSW rotation drive mechanism. The method comprises the steps of: 1, start the control mechanism; step 2, the control mechanism controls the material feeding mechanism to feed filling material; step 3, print 3D product with FSW mechanism. The invention achieves additive manufacturing and 3D printing with a new friction stir welding technology. The invented method has many advantages such as can handle a wide range of raw materials, has high printing speed, has high efficiency, has low energy consumption, requires low cost, is broadly applicable in different situations, is environmentally friendly, and is easy to automate. The products manufactured following this invention is formed through semi-solid forming technology. They will have good mechanical properties and low price.

10 Claims, 3 Drawing Sheets

(56) References Cited

U.S. PATENT DOCUMENTS

| | | | |
|---|---|---|---|
| 6,572,007 B1 * | 6/2003 | Stevenson | B23K 20/122 228/112.1 |
| 6,933,057 B2 | 8/2005 | Young et al. | |
| 7,131,567 B2 * | 11/2006 | Grong | B21C 23/005 228/164 |
| 7,255,258 B2 | 8/2007 | Burford et al. | |
| 7,464,852 B2 | 12/2008 | Waldron et al. | |
| 8,875,976 B2 | 11/2014 | Schultz et al. | |
| 2003/0192941 A1 * | 10/2003 | Ishida | B23K 20/123 228/112.1 |
| 2007/0040006 A1 * | 2/2007 | Charles | B23K 20/122 228/112.1 |
| 2009/0039139 A1 | 2/2009 | Burton et al. | |
| 2009/0152328 A1 * | 6/2009 | Okamoto | B23K 20/126 228/112.1 |
| 2011/0266330 A1 * | 11/2011 | Bruck | B23K 20/128 228/112.1 |
| 2015/0336204 A1 * | 11/2015 | Singh | B23K 20/122 228/112.1 |
| 2016/0263696 A1 * | 9/2016 | Nishida | B23K 20/1255 |
| 2017/0297142 A1 * | 10/2017 | Saito | B23K 20/128 |
| 2017/0297143 A1 * | 10/2017 | Saito | B23K 20/1255 |

FOREIGN PATENT DOCUMENTS

| | | | | |
|---|---|---|---|---|
| JP | 2003062681 A * | 3/2003 | | B23K 20/128 |
| JP | 2004025296 A * | 1/2004 | | B23K 20/124 |
| WO | WO 2016/111279 A1 * | 7/2016 | | |
| WO | WO 2016/111351 A1 * | 7/2016 | | |

\* cited by examiner ents 3D printing toolpath for printing product. The CNC machine or robot controller receives instructions from the IPC and controls the motion of FSW pins. The controller also sends actual position back to IPC through feedback signal cable, which forms a close-loop control of print path. The control of the FSW pins is similar to the control of the nozzle in traditional 3D printing.

3D PRINT APPARATUS AND METHOD UTILIZING FRICTION STIR WELDING

BACKGROUND OF THE INVENTION 3D printing integrates many technologies such as Computer-Aided Design (CAD), Computer-Aided Manufacturing (CAM), powder metallurgy and heat cladding. The basic principle is to generate 3D model with cross-sectional pattern and model the fused deposition and sintering path for the object to be formed. Heat source travels along the planned path and creates melt pool on the surface of the produced part, alloy powder is delivered to the melt pool and then cools off to form solid alloy. The heating source and the manufacturing station follows the predefined trajectory by CAD to produce the final product line by line and layer by layer. Different heating sources and processing technology can be used to produce final products with certain mechanical properties. 3D metal printing technology can be applied to many areas, such as mold manufacturing and repair, turbine blades repair, rapid prototyping, etc. Typically, 3D metal printing technology is thought to be complementary to the traditional manufacturing methods. It is good for materials that have high unit cost and products that are hard to manufacture with traditional methods (e.g. products with complex or irregular shape). Current 3D metal printing also has some limitations:
1) Current 3D printing technology often use powder material as the feeding materials, however, most of the materials have low efficiency of cladding, and are slow to process (e.g. alloy power materials).
2) Alloy powders are limited in type and are expensive, constraining the 3D Therefore, how to increase the types of raw alloy materials for 3D printing, improve efficiency, enhance quality, and reduce cost have become important research areas for the industry.

SUMMARY OF THE INVENTION

To increase the available types of filling materials, increase efficiency and reduce the processing cost of current 3D printing technology. The present invention provides a 3D printing device and method incorporating a new mechanism of friction stir welding.

The apparatus of this invention includes an automatic feeding mechanism, a FSW rotation drive mechanism, a control mechanism, and a FSW mechanism. The control mechanism controls the material feeding mechanism, the rotation drive mechanism and the FSW mechanism. In addition to the control mechanism, the friction stir welding mechanism also connects to the FSW rotation drive mechanism.

The FSW mechanism in this invention produces convex weld with programmable path, which makes it possible to use friction stir welding as a way for 3D printing and additive manufacturing. The invention improves the additive manufacturing efficiency, increases the available source materials for 3D printing and reduces the cost.

The FSW mechanism comprises a power input shaft, a transmission shaft, a left and a right drive shaft. The power input shaft connects to the transmission shaft, which then connects to the right drive shaft. The right drive shaft powers right spindle through the right universal joint. The right FSW pin is attached to the right spindle. The power input shaft also connects to the left drive shaft which powers left spindle through left universal joint. The left FSW pin is attached to the left spindle. The FSW mechanism has upper and lower covers, left and right friction stir pins extend out through the bottom of the lower cover. The left and right spindles and the pins are symmetrical with respect to the axis of power input shaft. The left and right spindles also form angle with the axis of power input shaft. There is a micro forging system adjacent to the two friction stir spindles. The micro forging system includes a vibration generator, pushrod and hammer, vibration generator connects to the hammer through pushrod.

Further, there is an auxiliary heating device next to the FSW pins. An energy regulator is used to adjust the heat output. The invention adds the auxiliary heating device to the FSW mechanism to increase the welding efficiency.

The material feeding mechanism has a feeding material storage which can be filled with welding filling materials. Further, the material feeding mechanism includes a stepper motor, material feeding wheels (including a driving wheel and a driven wheel). Stepper motor is fixed to the driving wheel and control the rotation of the driving wheel. The welding filling material, which has a V-shape cross-section, can be pulled out of the storage and go through the gap between the driving and driven wheels. The mechanism also includes a base board for 3D printing. The power input shaft from the FSW mechanism is perpendicular to the base board. The invention provides a way to continuously feed the filling material to the FSW mechanism. It also eliminates clamps needed as in traditional FSW machines.

The rotation drive mechanism is the motor which is controlled by the control mechanism. The output shaft of the motor connects to the power input shaft.

The control mechanism comprises with an industrial personal computer (IPC), a CNC or robot controller, a signal synchronizer, a material feeding controller, a FSW mechanism rotation controller, a vibration controller, an auxiliary heat device controller. The material feeding controller connects to the stepper motor. The FSW mechanism rotation controller connects to the motor with feedback signal cable. The vibration controller connects to the vibration generator. The auxiliary heat device controller connects to the auxiliary heat device. The control mechanisms are powered up by industrial direct current (DC). These connections create an industrial controller area network (CAN) allowing individual controllers and equipment communicate with each other and work synchronically together. This ensures the quality of the finished product.

Another objective of the invention is to provide a 3D printing method with the above apparatus, the method comprises the steps of:
  Step 1, start the control mechanism;
  Step 2, the control mechanism controls the automatic feeding mechanism to feed filling material;
  Step 3, print 3D product with the FSW mechanism.

The 3D printing method utilizes a new way of friction stir welding producing products with high mechanical properties. The method can obtain products with V-shaped mesh weld structure, and can incorporate micro forging and rapid cooling processes. Combined with the traditional post-heat treatment methods, this invention can improve the mechanical properties of the raw welding filling material.

Furthermore, the cross-section of the 3D products has the V-shaped mesh structure. This ensures that the weld material fills the cross-section of the 3D product which prevent welding defects effectively. This also makes it easy to plan the weld with the invented apparatus and print product line by line and layer by layer.

The control mechanism includes the IPC, the CNC machine or robot controller. The IPC plans and automatically generates control program for the FSW rotation drive mechanism based on the final product. The control program in IPC and the G-Code in CNC or robot controller (G-Code: a programming language mainly in computer-aided manufacturing to control CNC or robot) run simultaneously for synchronization purpose. The control program in IPC controls the whole FSW mechanism rotates ensuring the centerline of the two FSW pins is always perpendicular to the forward moving direction of CNC or robot station (reflected in the G-Code). Because of this, the apparatus can handle not only straight line but also curve line welding.

The benefits of this invention are as follows:

(1) The present invention utilizes friction stir welding in 3D printing and additive manufacturing. It can handle a wide variety of materials and can print product with high speed, high efficiency, low energy consumption, low cost. It is environmentally friendly and enables high degree of automation. The products produced by this method follows semi-solid forming procedure which eliminates the problems caused by melting the materials. The result are products with good mechanical properties and low price.

(2) The present invention eliminates the need for clamps when performing friction stir welding. This increases the welding efficiency and material utilization. It is a big step forward to enable automation in the FSW based 3D printing.

1, stepper motor;
2, material feeding driving wheels;
3, welding base board;
4, right FSW pin;
5, hammer;
6, left FSW pin;
7, pushrod;
8, vibration generator;
9, left spindle;
10, left universal joint;
11, CNC or robot controller;
12, signal synchronizer;
13, FSW mechanism rotation controller;
14, industrial CAN network;
15, power cable;
16, motor;
17, feedback signal cable;
18, left drive shaft;
19, power input shaft;
20, transmission shaft;
21, right drive shaft;
22, upper cover;
23, lower cover;
24, right universal joint;
25, right spindle;
26, auxiliary heating device;
27, energy regulator;
28, material feeding controller;
29, auxiliary heating device controller;
30, filling material storage;
31, vibration controller;
32, industrial PC (IPC).

DETAILED DESCRIPTION OF THE INVENTION

Figure 1:
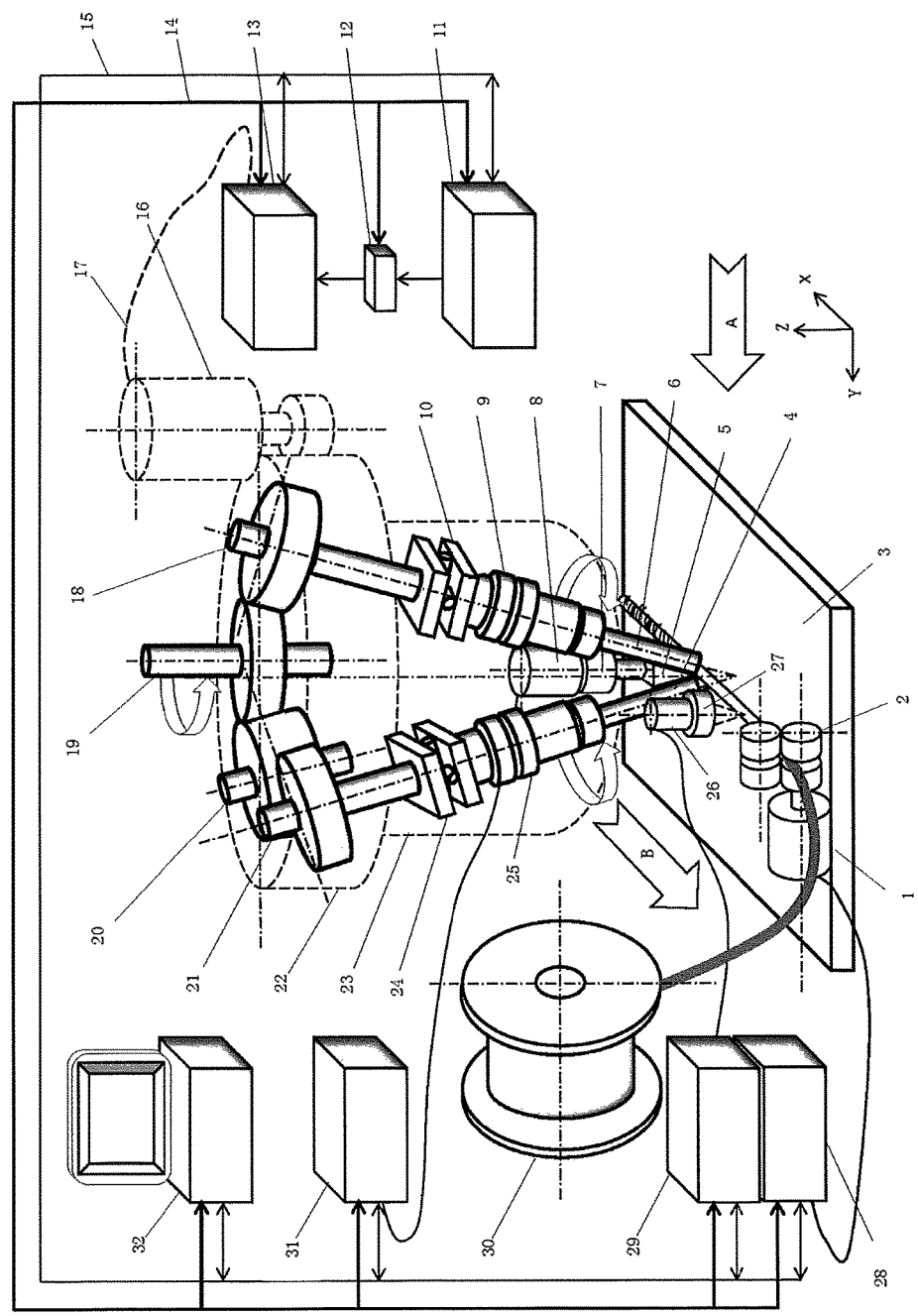
FIG. 1 is a schematic diagram of the 3D printing apparatus while working.

As shown in FIG. 1, the invention discloses a 3D printing apparatus utilizing FSW technology for additive manufacturing. The apparatus includes the material feeding mechanism, the control mechanism, the FSW mechanism, and the FSW rotation drive mechanism. The materials feeding mechanism can send the weld materials to the FSW mechanism automatically. The Control mechanism controls the material feeding mechanism and the FSW rotation drive mechanism. The FSW mechanism is connected to the rotation drive system and the control system. With the two FSW pins pressing the filling material, the FSW mechanism can pressure the raw material firmly onto the base board without the need for clamps. The process involves FSW mechanism makes friction and generate heat, grinding and stirring the materials, perform semi-solid metal forging and rapid cooling. Two friction stir pins work on the weld material simultaneously to form a convex weld. Through cross section CAD planning, these convex welds can be straight or curve lines and used to form layers. Multiple layers can then form the 3D products with specific shapes.

The FSW mechanism includes power input shaft (19), the transmission shaft (20), the left drive shaft (18), the right drive shaft (21), the left spindle (9), the right spindle (25), the left FSW pin (6) and the right FSW pin (4). On the right hand side, the transmission shaft (20) makes sure the right drive shaft (21) rotates in the same direction as the power input shaft (19). The right drive shaft (21) connects to the right spindle (25) through the right universal joint (24). The right spindle (25) holds the right FSW pin (4). On the left hand side, the power input shaft (19) drives the left drive shaft (18) and makes it rotate in the opposite direction as the power input shaft (19). The left drive shaft (18) connects to the left spindle (9) through the left universal joint (10). The left spindle (9) holds the left FSW pin (6). The FSW mechanism has upper (22) and lower covers (23), the left and right FSW pins extend out through the bottom of the lower cover (23). The left and right spindles and the pins are symmetrical with respect to the axis of the power input shaft (19). There is a micro forging mechanism located adjacent to the two spindles. The micro forging mechanism can improve the material's mechanical properties through material deformation, strengthening, and rapid cooling process.

More specifically, the Micro forging mechanism includes vibration generator (8), pushrod (7) and hammer (5). The vibration generator (8) connects to the hammer (5) through the pushrod (7). The vibration generator (8) is the source for micro vibration. It can be ultra-sound vibration generator, micro vibration motor or electromagnetic vibration generator. The vibration is along the axis of the power input shaft (19). The vibration frequency and amplitude can be controlled by the IPC (32) in the control mechanism. When the vibration controller (31) receives signal from the IPC (32), it can interpret the signal and control the vibration generator (8), pushrod (7) and hammer (5) accordingly. Hammer (5) vibrates up and down along the axis of the power input shaft (19), and forges the newly welded filling material. The hammer (5) can take different shapes to meet the final product's need for different internal grains and external profiles. If using ultra-sound as an example, the vibration controller (31) can be ultrasound wave generator. The vibration generator (8) can be ultrasonic vibration transducer, the pushrod (7) and hammer (5) can be ultrasonic transducer resonator. With different type of forging methods (such as hot forging, warm forging or cold forging), the defects (such as shrinkage, voids and segregation) in the thermoplastic materials can be eliminated, achieving structural integrity and better quality. Mechanical properties can be improved through breaking up the coarse grain structure in the raw material and forming finer grains through recrystallization. The final product will have higher strength and resistance to loads and temperature but with lower elasticity.

This invention also includes an auxiliary heating unit (26) located next to the left and right FSW pins. The auxiliary heating unit (26) could use laser, electron beam or ion beam as the energy to improve the speed of friction stir welding. The auxiliary heating unit (26) has energy regulator (27), which can then be controlled by the control mechanism. The auxiliary heating unit (26) is connected to auxiliary heat controller (29) through network cable. The IPC (32) in the control mechanism is connected to the auxiliary heating controller through industrial CAN network. The auxiliary controller (29) follow the signal of IPC (32) to control the heat generation for preheating the welding materials.

The FSW mechanism has upper cover (22) and the lower cover (23). Inside the upper cover (22), there are power input shaft (19), transmission shaft (20), left drive shaft (18) and right drive shaft (21) connected through the roller bearings or bolts. Inside the lower cover (23), there are left universal joint (10), left spindle (9), left FSW pin (6), right universal joint (24), right spindle (25), and right FSW pin (4) connected also through the roller bearings or bolts. The left and right FSW pins protrude from the bottom of the lower cover (23).

Figure 2:
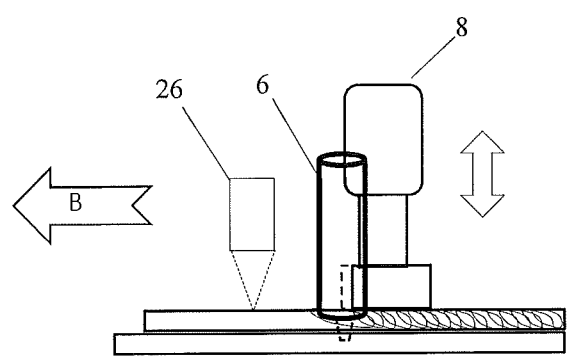
FIG. 2 is a side view of the 3D printing apparatus while working.

As shown in FIG. 2, while working, the left FSW pin (6) and the right FSW pin (4) apply pressure together to the welding material (coming out of the material feeding mechanism) against the base board (3). The power input shaft (19) rotates counterclockwise and drives left drive shaft (18) and the transmission shaft (20) rotate clockwise. The transmission shaft (20) then drives the right drive shaft (21) rotates counterclockwise. The left drive shaft (18) makes left universal joint (10) and left spindle (9) rotate clockwise. The right drive shaft (21) makes the right universal joint (24) and the right spindle (25) rotate counterclockwise. The FSW mechanism also has welding base board (3) and is perpendicular to the power input drive (19). To avoid filling material moves out of the position while performing FSW, the FSW pins press from both sides of the power input shaft (19) and form the same angle with the shaft. The recommended angles are 45 degrees, 30 degrees, 15 degrees and 3 to 5 degrees. The two FSW spindles rotate together in the opposite directions—one clockwise, one counterclockwise. The force along the axis of the power input shaft (19) pressure the filling materials firmly on the base board. The forces perpendicular to the axis of the power input shaft (19) cancel each other which eliminates the need for additional clamps while performing FSW. The left FSW pin (6) and the right FSW pin (4) symmetrically clamp welding materials. As the FW pins put pressure on the welding materials and spins rapidly, heat is generated from the frictions between the pins and the materials. The heat causes the materials to soften without melting. The FSW pins break up the coarse grain structure and generate a plasticized area around the pins. As the pin travels forward, the material behind the pin can be forged and strengthened through material deformation. Through micro forging, the material in the plasticized area also cools down rapidly. The hammer (5) in the micro forging mechanism can take different shapes based on the need for different internal grains and external surface profiles of the final product. Because the FSW pins form an angle, the weld filling material has corresponding profile. The left and right FSW pins will create raised weld and the shape is defined by the micro forging hammer. The apparatus can also perform FSW without filling materials just like traditional FSW machines.

Figure 3:
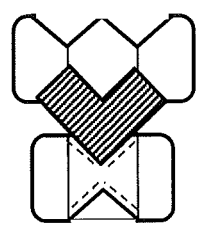
FIG. 3 is the sketch illustrating the V-shaped filling material going through the driving and driven wheels.

The material feeding mechanism is consisted with weld material storage (30), material feeding stepper motor (1), material feeding driving wheels (2), material feeding controller (28). As shown in FIG. 3, the material feeding driving wheels have the driver wheel on top and driven wheel at the bottom. The filling material has a V shape profile. As shown in the example, the shapes of the driver wheel and driven wheel match the shape of the filling material profile. The driver wheel is fixed to the material feeding stepper motor (1) and can pull the V-shaped filling material from the weld material storage (30) to go through the gap between the driving wheel and the driven wheel. The filling material is then welded onto the welding base board (3). The welding power input shaft (19) is perpendicular to the welding base board (3). The left and right spindles are symmetrically located along the axis of the power input shaft (19) and form the same angle with the axis of the power input shaft (19). Based on the current welding speed, IPC 32 send live signal to the material feeding controller (28) which then controls the material feeding stepper motor (1) and the driving wheel to control the speed of feeding weld material thus achieves automated manufacturing. The welding filling material in this invention can be solid alloy materials (such as aluminum-magnesium alloys, copper alloys, titanium, steel, etc.) or other hot-melt composite materials.

The FSW rotation drive mechanism is the motor (16). It is connected to and can be controlled by the FSW mechanism rotation controller (13) in the control mechanism. The FSW rotation drive mechanism controls the real-time rotation of the whole FSW mechanism.

The control mechanism is consisted of IPC (32), CNC or robot controller (11), signal synchronizer (12), material feeding controller (28), FSW mechanism rotation controller (13), vibration mechanism controller (31), auxiliary heating device controller (29). They are all connected to the industrial CAN network which facilitates the signal communication (e.g. feed filling material, rotate the whole FSW mechanism, start welding, start micro forging and start auxiliary heat, etc.) within the network. The material feeding controller (28) connects to material feeding stepper motor (1). The FSW mechanism rotation controller (13) connects to the motor (16). The vibration controller (31) connects to the vibration generator (8). The auxiliary heating device controller (29) connects to the auxiliary heating device (26). The control mechanism is powered by industrial DC power cable (15). The FSW mechanism rotation controller (13) and motor (16) are connected by feedback signal cable (17). With the industrial CAN network, all parts of this invention (material feeding, welding, rotation of the FSW mechanism, auxiliary heat, micro forge and rapid cooling) can work together to achieve manufacturing automation. With signal synchronizer (12), the direction and the rotation of the whole FSW mechanism is matched with the coordinates movement speed of the CNC or robot station. In this process, the real-time FSW rotation control program run by IPC (32) needs to read the X-Y coordinates movement speed of the CNC or robot station through signal synchronizer. Signal synchronizer (12) pull the data from both FSW rotation control program and the G-Code in the CNC or robot station and send feedback to IPC (32), IPC (32) also coordinates and send corresponding information to the material feeding controller (28) through the industrial CAN network and adjust the material feeding speed. The material feeding controller interpret the signal and send the command to material feeding stepper motor (1).

It is important to note, the FSW mechanism in this invention has dual spindles symmetrically located on both sides along the main axis of the power input shaft (19) and rotate in the opposite directions. When there is a need for a curved weld, the whole FSW mechanism must rotate (to keep the centerline of the spindles perpendicular to the forward welding direction) which is controlled by the FSW rotation drive mechanism—the motor (16). When the FSW mechanism rotation controller receives signal from IPC (32) through the industrial CAN network to rotate, the command is passed to motor (16) which drives the whole FSW mechanism rotate. The rotation progress is then sent back to IPC (32) through the signal feedback cable to close the signal feedback loop. Because of the closed feedback loop, IPC (32) not only sends out a control request, but also receives real time feedback on how successful the requests are completed in case any adjustment or compensation is needed. The closed loop control mechanism can ensure the accuracy of the control thus the quality of the product.

This invention also discloses a 3D printing method with FSW to produce product with better mechanical properties. The steps for the method are:

Step: 1, start the control system;

step 2, the control system controls the automatic feeding mechanism to feed material;

step 3, print 3D product with the FSW mechanism. The welds can be planned by CAD/CAM. The cross-section of the printed 3D products has a V-shaped mesh structure.

The control mechanism for this method involves IPC (32) and CNC or robot controller (11). IPC (32) generates control program for the rotation of the FSW mechanism based on the final 3D products. The control program controls rotation of the whole FSW mechanism. The control program in IPC (32) is run at the same time with the G-Code in the CNC or robot controller (11). The control program ensures the centerline of the two spindles in the dual spindles FSW mechanism is always perpendicular to the CNC or robot station forward direction. In FIG. 1, the direction B represents the FSW mechanism forward direction, and A represents the direction perpendicular to the weld (the direction of the centerline between the two spindles).

Figure 4:
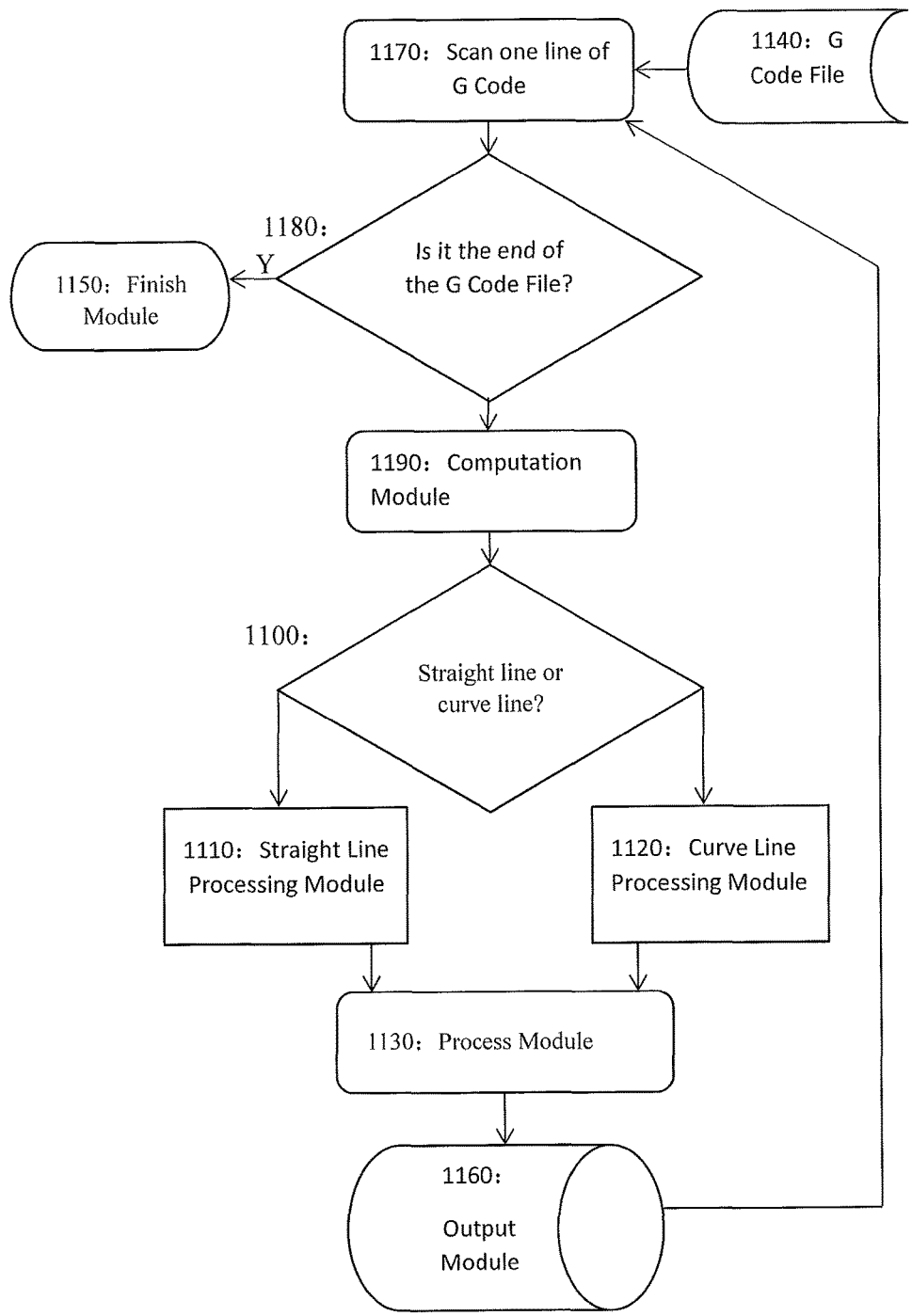
FIG. 4 is the flow diagram for synchronization between the rotation of the FSW mechanism and the movement of the CNC or robot system.

As shown in FIG. 4, one example of the control program can be:

1170 Scan Module: Scan one line of G-Code from 1140.

1180 Decision Module: Is this the beginning or ending of the G-Code? If it is the ending, go to 1150. If it is the beginning, open the real time FSW rotation control output protocol. If it is neither the beginning nor the ending of the G-Code, continue the following program.

1190 Computation Module: Map the current FSW spindles position onto the CNC or robot station XY coordinates.

1100: Decision Module: Dose the current G-Code produce a straight line (G01) or curved line (G02, G03)?

If it is a straight line, go to 1110 Straight Line Processing Module: Read the start and end points data, go to 1130.

If it is a curved line, go to 1120 Curved Line Processing Module: Read the center, radius, start and end points data, go to 1130.

1130 Process Module: Translate the G-Code from 1110 and 1120 into data needed by the FSW rotation control program including line start symbol, current program line number, CNC or robot station coordinates and range of changes, rotation equivalent angle and the range changes, line end symbol, etc.

1140 Storage Module: Store the G-Code and support the read.

1160 Output Module: Package the code from the 1130 Process Module, output to the control program then go back to 1170.

1150 Finish Module: Finish the process, save the end of file symbol, close the real time FSW rotation control program, close the process.

The main function of this process is to scan the G-Code line by line, record the program line, translate the current FSW mechanism coordinates to the CNC or robot coordinates system, decide the line shape, generate the coordinates needed for the FSW rotation control program, interpret the amount of rotation needed for the FSW mechanism with each line of G-Code, output the real-time control program to control the FSW rotation motor. The control program is used by IPC (32) to be synchronized with CNC or robot system G-Code matching all the criteria (e.g. line starts symbol, the current line number, CNC or robot system coordinates, etc.) till the end of the G-Code. The last step of this 3D printing process is to use the control program on IPC (32) and the G-Code on CNC or robot controller to produce the product.

It should be further understood by those skilled in the art that although the foregoing description has been made on embodiments of the invention, the invention is not limited thereto and various changes and modifications may be made without departing from the spirit of the invention and the scope of the appended claims.

We claim:

1. A 3D printing apparatus, comprising: a material feeding mechanism, a control mechanism, a friction stir welding rotation drive mechanism, and a friction stir welding mechanism configured to weld using 3D printing filling material, the control mechanism configured to control the material feeding mechanism, the friction stir welding rotation drive mechanism and the friction stir welding mechanism to make 3D products made out of 3D printing material, the friction stir welding mechanism connected to the friction stir welding rotation drive mechanism that includes a power input shaft (19), a transmission shaft (20), a left drive shaft (18), a right drive shaft (21), a left spindle (9), a right spindle (25), a left friction stir welding pin (6) and a right friction stir welding pin (4) that controls the real-time rotation of the friction stir welding mechanism.

2. The 3D printing apparatus per claim 1, whereas the material feeding mechanism includes weld material storage (30) which stores 3D printing filling material.

3. The 3D printing apparatus per claim 1, further including an auxiliary heating unit that includes an energy regulator (27).

4. The 3D printing apparatus per claim 2, whereas the material feeding mechanism includes a material feeding stepper motor (1) and at least one material feeding driving wheel (2).

5. The 3D printing apparatus per claim 1, whereas the friction stir welding rotation drive mechanism is a motor (16).

6. The 3D printing apparatus per claim 1, further including a forging mechanism.

7. The 3D printing apparatus per claim 1, whereas the control mechanism comprises a computer (32), a CNC or a robot controller (11), a signal synchronizer (12), a material feeding controller (28), a friction stir welding mechanism rotation controller (13), a vibration mechanism controller (31), and an auxiliary heating device controller (29).

8. The 3D printing apparatus per claim 1, whereas the material feeding mechanism includes a material feeding stepper motor (1) and at least one material feeding driving wheel (2).

9. The 3D printing apparatus as recited in claim 6, wherein the forging mechanism includes a vibration generator (8), a pushrod (7) and a hammer (5).

10. A 3D printing apparatus, comprising:
   a welding base board;
   a material feeding mechanism that delivers 3D printing material onto the welding base board;
   a control mechanism;
   a friction stir welding rotation drive mechanism;
   a friction stir welding mechanism that includes:
      a rotating power input shaft perpendicularly aligned with the welding base board and being coupled to the friction stir welding rotation drive mechanism;
      a rotating transmission shaft coupled to the input shaft configured to rotate in a direction opposite the rotation of the input shaft;
      a first drive shaft coupled to the input shaft and configured to rotate in the opposite direction as the input shaft, the first drive shaft includes a universal joint connected to a spindle that connects to a diagonally aligned pin aimed at the 3D printing material located on the welding base board and intersects the longitudinal axis of the input shaft; and
      a second drive shaft coupled to the transmission shaft and configured to rotated in the same direction as the power input shaft, the second drive shaft includes a universal joint connected to a spindle, the spindle that connects to a diagonally aligned pin aimed at the 3D printing material located on the welding base board and intersects the longitudinal axis the input shaft on the opposite side of the longitudinal axis.

* * * * *